March 20, 1962

D. E. THOMAS 3,026,479

NULL TYPE TRANSISTOR ALPHA GREATER THAN UNITY MEASURING SET

Filed Nov. 23, 1959

INVENTOR
D. E. THOMAS
BY R. B. Ardis
ATTORNEY

March 20, 1962

D. E. THOMAS 3,026,479

NULL TYPE TRANSISTOR ALPHA GREATER
THAN UNITY MEASURING SET

Filed Nov. 23, 1959

INVENTOR
D. E. THOMAS
BY
ATTORNEY

INVENTOR
D. E. THOMAS
BY
R. B. Ardis
ATTORNEY

3,026,479
NULL TYPE TRANSISTOR ALPHA GREATER THAN UNITY MEASURING SET

Donald E. Thomas, Madison, N.J., assignor to Bell Telephone Laboratories, Incorporated, New York, N.Y., a corporation of New York
Filed Nov. 23, 1959, Ser. No. 854,730
9 Claims. (Cl. 324—158)

This invention relates generally to the measurement of the electrical operating characteristics of transistors and more particularly to the measurement of common base current amplification factors (alpha) which are greater than unity.

A principal object of the invention is to increase the accuracy of measurement of transistor common base current amplification factors which are greater than unity.

A related object is to free the measurement of common base current amplification factors which are greater than unity from dependence upon the accuracy with which the magnitude of a current or a voltage can be determined by a meter reading.

Still another object of the invention is to free the accuracy of measurement of transistor common base current amplification factors which are greater than unity from dependence upon constancy in signal generator level.

An additional object is to provide for the automation of the measurement of transistor common base current amplification factors greater than unity.

In the fundamental study of the current amplification characteristics of transistors, attention is directed to the common base current amplification factor, alpha, which is defined as the ratio of collector current to emitter current while the collector is shorted to the base. The value of alpha is usually less than unity, but as the collector voltage is increased the number of carriers is increased and the collector barrier narrows. With increasing collector voltage the collector current eventually exceeds the emitter current and alpha becomes greater than unity. This phenomenon is called the avalanche effect.

In the past most transistor alpha measuring sets for the measurement of values of alpha less than and greater than unity have required the adjustment of a standard emitter signal current followed by the reading of a potential across a calibrated resistance. This technique required two separate and distinct meter readings if a single instrument were to be used for both calibration and measurement. Since this technique necessitated that the readings be taken at different times the signal generator level had to be constant. Furthermore, since the measurement of alpha is determined by the ratio of two meter readings the maximum precision of measurement is litmited by the accuracy of the meters.

This invention eliminates the above limitations in the measurement of transistor current amplification factors which are greater than unity. In accordance with a principal feature of this invention a first fixed terminal of a potentiometer is connected to the collector electrode of the transistor to be tested, a signal generator is connected between the transistor emitter electrode and the second fixed terminal of the potentiometer, a resistor of fixed value is connected between the base electrode of the transistor and the movable contact of the potentiometer, and a null-reading voltage measuring device is connected between the transistor base and the second fixed terminal of the potentiometer. When the position of the movable contact is adjusted to give a null reading on the voltage measuring device, alpha is a function of the position of the movable contact on the potentiometer. In general, alpha is given by the sum of one plus the ratio of the resistance between the second fixed terminal of the potentiometer and the movable contact of the potentiometer to the resistance of the resistor of fixed value. Since the voltage measuring means is used only to provide a null reading, measuring accuracy is freed from dependence upon the accuracy with which a meter can be read. The potentiometer is capable of being calibrated with much greater precision than a meter and, furthermore, remains calibrated once it has been calibrated. Fluctuations in the signal level do not affect the accuracy of measurement, since the position of null balance is independent of signal level over a considerable range of signal level.

The chief advantage of this type of measurement over conventional alpha measuring techniques is that its calibration depends only upon the position of a linear potentiometer, and is therefore independent of changes in signal level and meter accuracy.

Null techniques have successfully been used to measure values of alpha less than unity. U.S. Patent 2,847,645, issued August 12, 1958, to the present inventor describes null-type transistor alpha measuring sets for the measurement of values of alpha less than unity. The measuring sets shown are primarily adapted, however, to the measurement of alpha less than unity.

In accordance with another feature of the invention, a high gain frequency selective amplifier tuned to the frequency $z$ of the A.-C. signal generator and having a suitable output indicating meter may be used as the null-reading voltage measuring device. The signal-to-noise ratio of the null indicator is thereby improved, and the detection of extremely low level signals is permitted.

In accordance with still another feature of the invention, servo techniques may be employed to balance the null detector automatically. In accordance with this feature of the invention, an A.-C. servo motor has its shaft position-coupled to the movable contact of the potentiometer. The signal generator supplies power to the power phase of the servo motor and also supplies a signal which is injected between the emitter electrode and the second fixed terminal of the potentiometer. The control phase of the servo motor is fed by the output of a servo amplifier whose input is connected between the base electrode of the transistor and the second fixed terminal of the potentiometer. The signal between the base electrode and the second fixed terminal of the potentiometer, amplified by the servo amplifier, drives the servo motor until the potentiometer setting is such that this voltage becomes zero, thus giving an automatic indication of the value of alpha in terms of the setting of the potentiometer.

The invention will be more fully understood from the following detailed description of preferred embodiments thereof taken in conjunction with the appended drawings in which.

Figure 1:
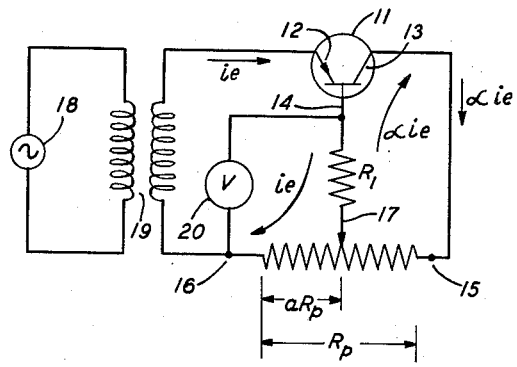
FIG. 1 illustrates the basic A.-C. alpha greater than unity measuring circuit featured by the invention.

The embodiment of the invention shown in FIG. 1 includes a transistor 11 having an emitter electrode 12, a collector electrode 13, and a base electrode 14. The conventional symbols used for transistors employ an arrow-head to indicate the emitter electrode and the direction of positive emitter current flow is indicated by the direction of the arrow. Thus, a transistor of the P-N-P type is indicated by an emitter arrow pointing toward the base and a transistor of the N-P-N type is indicated by an arrow pointing away from the base. The transistor shown in this and succeeding figures are, by way of example, P-N-P transistors, but it should be understood that the invention is applicable to the measurement of value of alpha of transistors of the opposite conductivity type as well. For transistors of the N-P-N type, currents flow in directions opposite to those shown in the drawings and all D.-C. bias supply polarities should be reversed.

The circuitry in the embodiment of the invention shown in FIG. 1 omits provision for D.-C. biasing for the sake of simplicity. The A.-C. circuitry includes a potentiometer having two fixed terminals 15 and 16 and a movable contact 17. An A.-C. signal is injected between the emitter electrode 12 and the fixed terminal 16 of the potentiometer by means of signal source 18 and transformer 19. The movable contact 17 of the potentiometer is connected to the base 14 of the transistor by means of a resistor $R_1$, and the collector electrode 13 is connected to the fixed terminal 15 of the potentiometer. To avoid reactance effects and to be well below the common emitter cut off frequency of the transistor, the frequency of A.-C. generator 18 is preferably in the audio range. In order to avoid overloading the transistor and to assure substantially linear operation the current supplied by the generator 18 through transformer 19 should be small in comparison with the D.-C. emitter biasing current.

The current flowing in resistor $R_1$ is $i_e - \alpha i_e$, the voltage across the resistor $R_1$ is $(i_e - \alpha i_e)R_1$, the current flowing between the movable contact 17 and the fixed terminal 16 is $i_e$, and the voltage between the movable contact 17 and the fixed terminal 16 is $i_e a R_p$, where $R_p$ is the total resistance of the potentiometer and $a$ is the ratio of the resistance between terminals 16 and 17 to the total resistance of the potentiometer. When the movable contact of the potentiometer is adjusted so that the voltmeter 20 connected between the base electrode and the second fixed terminal 16 of the potentiometer reads zero then:

$$(i_e - \alpha i_e)R_1 + i_e a R_p = 0$$

$$(1-\alpha)i_e R_1 + i_e a R_p = 0$$

$$\alpha - 1 = \frac{aR_p}{R_1}$$

$$\alpha = 1 + \frac{aR_p}{R_1} \quad (1)$$

$R_p$ is a linear potentiometer and is calibrated from zero to maximum resistance in terms of a linear scale of $n$ divisions, thus making $\alpha$ a linear function of the potentiometer setting. If $n_0$ is the setting of the potentiometer when the voltage between the base of the transistor and terminal 16 is zero then $$\alpha = 1 + \frac{n_0}{n}\frac{R_p}{R_1}$$

This apparatus can be made to read values of alpha directly for $\alpha$ greater than one. For example, if $R_p$ is made 100 ohms, $R_1$ made 1000 ohms and $n=1000$ then $$\alpha = 1 + n_0 \times 10^{-4}$$

and $\alpha$ is read in terms of $n_0$ for values of $\alpha$ from 1.000 to 1.100.

Figure 2:
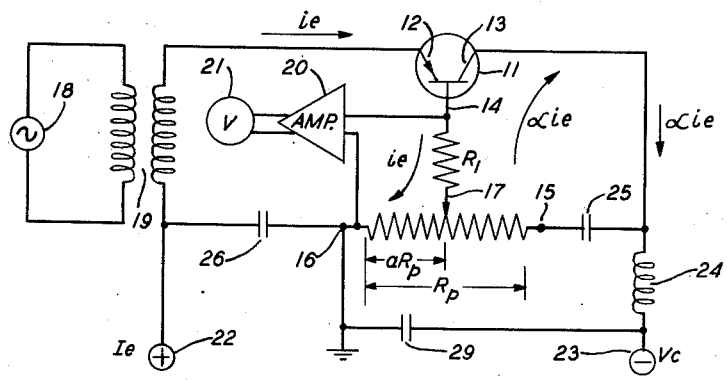
FIG. 2 illustrates an embodiment of the invention which provides for even greater accuracy of measurement.

The embodiment of the invention shown in FIG. 2 provides for even more accurate determination of $\alpha$. For completeness, D.-C. biasing circuits are shown in FIG. 2 as well as the necessary A.-C. circuitry. The null-voltage detecting device 20 is, in this embodiment of the invention, a high gain amplifier with an indicating meter 21 connected across its output. The amplifier 20 is tuned to the frequnecy of signal generator 18 permitting the detection of extremely low level signals, so that it is possible to set the movable contact 17 with a high degree of precision. The emitter electrode of transistor 11 is provided with a substantially constant current bias by a D.-C. source 22 which is poled to bias the emitter in the forward direction. The collector electrode 13 of transistor 11 is supplied with a substantially constant voltage bias by a D.-C. source 23 which is poled to bias the collector in the reverse direction and which is connected to the collector electrode by means of choke 24. Condensers 25, 26 and 29 are alternating current bypass condensers. Choke 24 prevents any A.-C. collector signal current from bypassing the potentiometer and producing an error in measurement.

In the operation of the alpha measuring set as illustrated in FIG. 2, the potentiometer is adjusted until the output meter reads zero, and alpha is read directly from the setting of the potentiometer movable contact, the potentiometer having previously been calibrated against a standard potentiometer.

Figure 3:
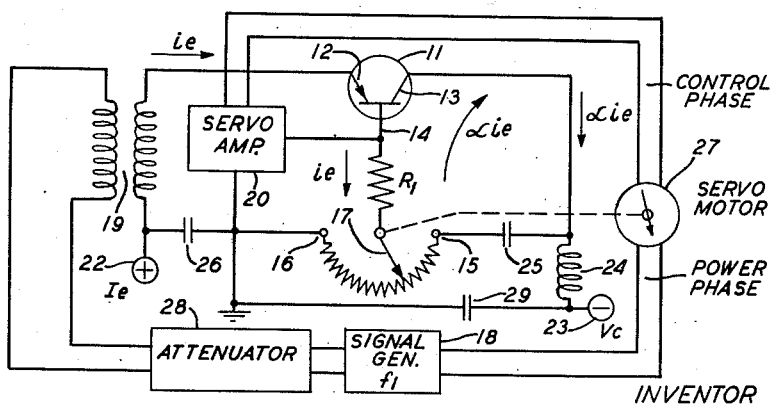
FIG. 3 illustrates an embodiment of the invention adapted for automatic operation.

An embodiment of the invention in which the previously calibrated potentiometer sets automatically to provide a null output is illustrated in FIG. 3. The null-voltage detection means in FIG. 3 is replaced by a servo amplifier tuned to the frequency of signal generator 18. The output of the servo amplifier feeds the control phase of servo motor 27, whose shaft is angular-position-coupled to the shaft of the balancing potentiometer of the measuring set. The power phase of servo motor 27 is fed from the same signal generator 18 which supplies the input signal to the transistor, as this is necessary in order to tie both the frequency and phase of the transistor input signal to those of the power phase of the servo motor. Since the power required to operate servo motor is much greater than that used to provide a signal at the transistor emitter electrode, an attenuator 28 is connected between the signal generator 18 and transformer 19. A signal at the output of servo amplifier 20 drives servo motor 27 until the input becomes zero thus balancing the potentiometer and giving an automatic indication of the value of alpha. If it is desired to obtain a printed record of the values of alpha an analog to digital converter may be connected to the balancing potentiometer, and the values of alpha may be indicated in digital form and automatically printed.

Figure 4:
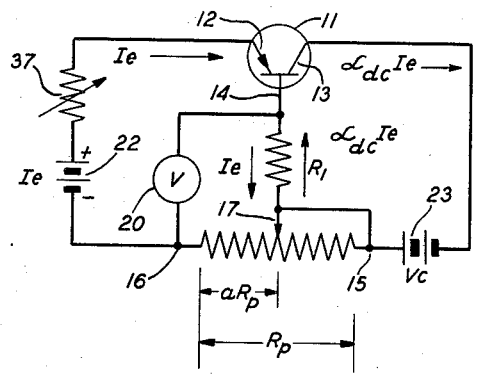
FIG. 4 illustrates an embodiment of the invention adapted for measuring the D.-C. value of alpha which is greater than unity.

The above-described apparatus is for measuring the small signal common base current amplification factor alpha; a similar circuit may be used for measuring the large signal or D.-C. alpha. The D.-C. alpha is defined as the ratio of the total D.-C. collector current to the total D.-C. emitter current and will be designated as $\alpha_{dc}$. FIG. 4 illustrates an embodiment of the invention for measuring the D.-C. value of alpha which is greater than unity. The circuit is similar to the circuit shown in FIG. 1, except for the fact that only D.-C. currents and D.-C. voltages are now present. Source 22 and variable resistor 37 are representative of a constant current emitter current source. The connection between movable contact 17 and terminal 16 is provided to prevent movement of the movable contact from changing the collector voltage. The current flowing in resistor $R_1$ is $$I_e - \alpha_{dc}I_e$$

The current flowing between the movable contact of the potentiometer and terminal 16 is $I_e$. When the D.-C. voltage between the base electrode 14 and terminal 16 of the potentiometer is made zero by positioning the movable contact of the potentiometer, then $$(1-\alpha_{dc})I_e R_1 + aR_{pe}I_e = 0$$

$$\alpha_{dc} = 1 + \frac{aR_p}{R_1} \quad (2)$$

Equation 1 is seen to be the same as Equation 2 so that calibration and read-out conditions are the same for the circuits of FIG. 1 and FIG. 4. By replacing the D.-C. voltmeter by a D.-C. servo amplifier and motor driving the movable contact of the potentiometer to the position of zero input to the servo system, this system can also be made automatic.

Figure 5:
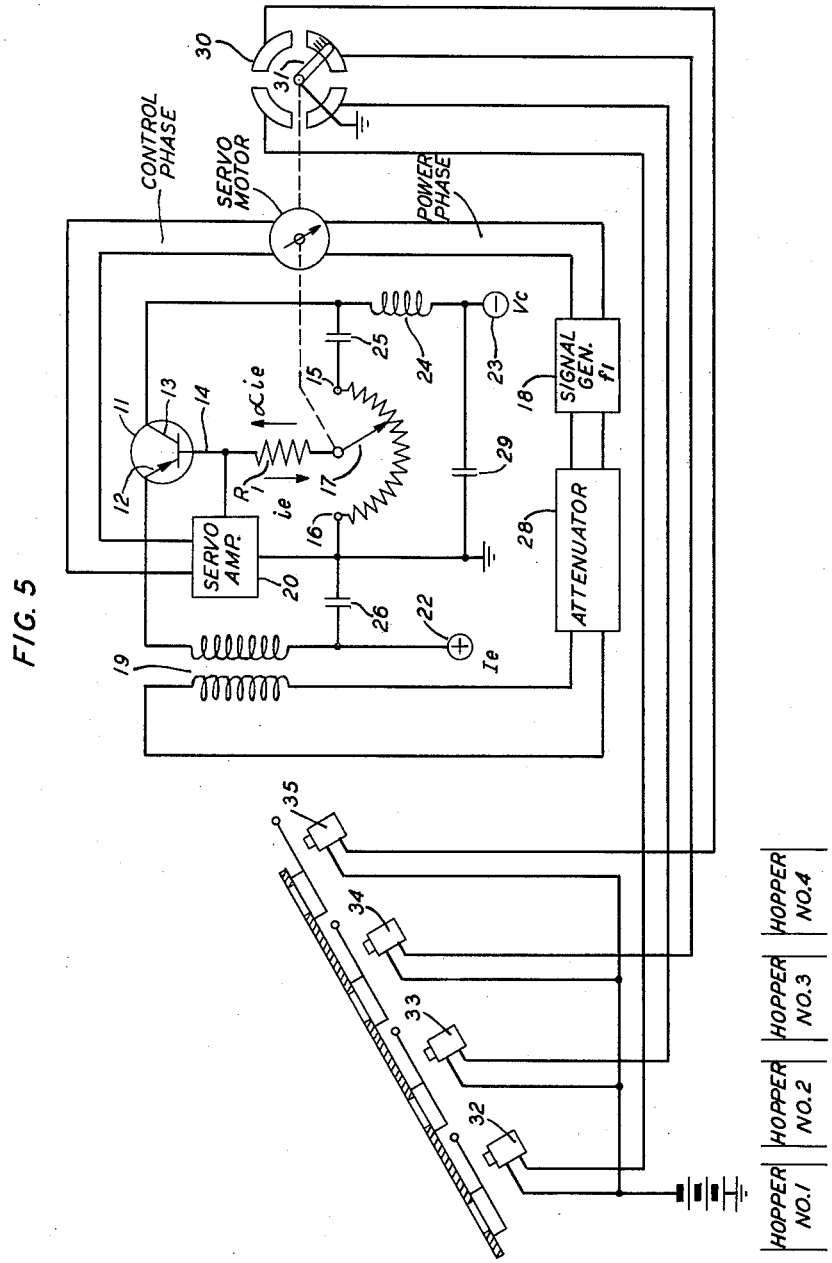
FIG. 5 illustrates an embodiment of the invention adapted for automatic measurement and sorting of transistors according to the value of alpha of the transistor.

The automation of the alpha measuring set shown in FIG. 3 may be extended by mechanically connecting a commutator 30 to the balancing potentiometer or servo motor shaft as shown in FIG. 5. Depending upon the position of the movable contact 17 of the potentiometer at the null balance point or, in other words, upon the value of alpha for the transistor being tested, a wiping arm 31 of the commutator is electrically connected to one of the several commutator segments. Each of these segments controls the opening of a hopper by means of a solenoid 32 through 35 as illustrated in FIG. 5, so that when the transistor being tested is dropped into a trough leading to the various hoppers, it falls into the hopper selected by the commutator. Transistors are thereby measured and sorted automatically in accordance with the values of alpha measured at any preselected operating point.

Figure 6:
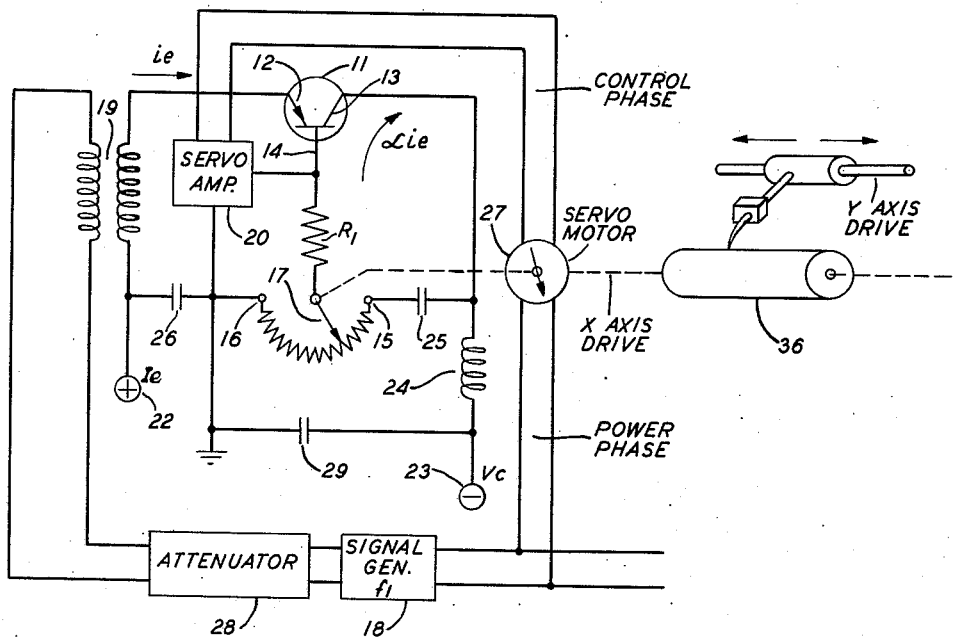
FIG. 6 shows an embodiment of the invention adapted to produce a permanent graph of the alpha characteristic of a transistor as a function of any selected operating parameter or ambient condition.

FIG. 6 illustrates a method for obtaining a direct-reading graph showing alpha as a function of an independent variable. The measuring potentiometer is connected mechanically to one axis of an X—Y recorder 36 or is read out electrically to the axis of the recorder. An operating condition is varied and data defining the condition fed into the second axis of the recorder resulting in a direct-reading graph. This arrangement is simpler and much less costly than the electrically swept alpha versus emitter current sweepers found in the current prior art.

It is to be understood that the above-described arrangements are illustrative of the application of the principles of the invention. Numerous other arrangements may be devised by those skilled in the art without departing from the spirit and scope of the invention.

What is claimed is:

1. In combination with a transistor having an emitter electrode, a collector electrode, a base electrode, and a common base current amplification factor greater than unity, an arrangement for measuring said current amplification factor which comprises means to supply direct operating potentials to said electrodes, a potentiometer having a movable contact and a pair of fixed terminals the first of which is connected to said collector electrode, an input signal source connected between said emitter electrode and the second fixed terminal of said potentiometer, a resistor connected between said base electrode and said movable contact of said potentiometer, and null-reading voltage measuring means connected between said base electrode and said second fixed terminal of said potentiometer.

2. In combination with a transistor having an emitter electrode, a collector electrode, a base electrode, and a common base current amplification factor greater than unity, an arrangement for measuring said current amplification factor which comprises means to bias said emitter electrode in the forward direction, means to bias said collector electrode in the reverse direction, a potentiometer having a movable contact and a pair of fixed terminals the first of which is connected to said collector electrode, an input signal source connected between said emitter electrode and the second fixed terminal of said potentiometer, a resistor connected between said base electrode and said movable contact of said potentiometer, and null-reading voltage measuring means connected between said base electrode and said second fixed contact of said potentiometer, whereby the common base current amplification factor of said transistor is represented by the position of said movable contact of said potentiometer at which a null indication is obtained on said voltage measuring means, and the accuracy of representation is independent of fluctuations in the amplitude of the signal produced by said source.

3. In combination with a transistor having an emitter electrode, a collector electrode, a base electrode, and a common base current amplification factor greater than unity, an arrangement for measuring said current amplification factor which comprises means to bais said emitter electrode in the forward direction, means to bias said collector electrode in the reverse direction, a potentiometer having a movable contact and a pair of fixed terminals the first of which is connected to said collector electrode, a substantially single frequency input signal source connected between said emitter electrode and the second fixed terminal of said potentiometer, a resistor connected between said base electrode and said movable contact of said potentiometer, null-reading voltage measuring means, and frequency-selective amplifying means tuned to pass the frequency of said input source having its input connected between said base electrode and said second fixed contact of said potentiometer and its output connected to said voltage measuring means, whereby the common base current amplification factor of said transistor is represented by the position of the movable contact of said potentiometer at which a null indication is obtained on said voltage measuring means even for low level signals from said source.

4. In combination with a transistor having an emitter electrode, a collector electrode, a base electrode, and a large signal or D.-C. alpha current amplification factor greater than unity, an arrangement for measuring said large signal or D.-C. current amplification factor which comprises means to supply direct-operating potentials to said electrodes, a potentiometer having a movable contact and a pair of fixed terminals the first of which is connected to said collector electrode and the second to said emitter electrode, a resistor connected between said base electrode and said movable contact of said potentiometer, and null-reading D.-C. voltage measuring means connected between said base electrode and said second fixed contact of said potentiometer.

5. In combination with a transistor having an emitter electrode, a collector electrode, a base electrode, and a common base current amplification factor greater than unity, an arrangement for measuring the common base current amplification factor of said transistor which comprises means to bias said emitter electrode in the forward direction, means to bias said collector electrode in the reverse direction, a potentiometer having a movable contact and a pair of fixed terminals the first of which is connected to said collector electrode, a signal source connected between said emitter electrode and the second fixed terminals of said potentiometer, a resistor connected between said base electrode and said movable contact of said potentiometer, an alternating current servo motor having a power phase, a control phase and a shaft position coupled to said potentiometer movable contact, means connecting the power phase of said servo motor to said signal source, and means connecting the control phase of said servo motor between said base electrode and said second fixed terminal of said potentiometer, whereby the common base current amplification factor of said transistor is represented by the positon of said movable contact on said resistance arm when said servo motor comes to rest.

6. In combination with a transistor having an emitter electrode, a collector electrode, a base electrode, and a common base current amplification factor greater than unity, an arrangement for measuring said current amplification factor which comprises means to supply direct operating potentials to said electrodes, a potentiometer having a movable contact and a pair of fixed terminals the first of which is connected to said collector electrode and the second to said emitter electrode, a resistor serially connected between said base electrode and said movable contact of said potentiometer, an input signal source connected in series with said potentiometer and said resistor between said base electrode and said emitter electrode, and null-reading voltage measuring means connected between said base electrode and said second fixed terminal of said potentiometer.

7. In combination with a transistor having an emitter electrode, a collector electrode, a base electrode, and a common base current amplification factor greater than unity, an arrangement for measuring said current amplification factor which comprises means to bias said emitter electrode in the forward direction, means to bias said collector electrode in the reverse direction, a potentiometer having a movable contact and a pair of fixed terminals the first of which is connected to said collector electrode, and the second is connected to said emitter electrode, a resistor serially connected between said base electrode and said movable contact of said potentiometer, an input signal source connected in series with said potentiometer and said resistor between said base electrode and said emitter electrode, a null-reading voltage measuring means connected between said base electrode and said second fixed contact of said potentiometer whereby the common base current amplification factor of said transistor is represented by the position of said movable contact of said potentiometer at which a null indication is obtained on said voltage measuring means, and the accuracy of representation is independent of fluctuations in the amplitude of the signal produced by said source.

8. A combination, in accordance with claim 5, which includes an X—Y recorder having one axis angular-position-coupled to the shaft of said servo motor and the other axis position-coupled to an operating parameter of said transistor.

9. A combination, in accordance with claim 5, which includes a commutator having a plurality of segments and a contact arm angular-position-coupled to the shaft of said servo motor, a plurality of hoppers corresponding to respective ones of said commutator segments, and means responsive to the position of said shaft and said potentiometer movable contact to open the one of said hoppers corresponding to the rest position of said potentiometer movable contact.

References Cited in the file of this patent

UNITED STATES PATENTS

| | | |
|---|---|---|
| 2,847,645 | Thomas | Aug. 12, 1958 |
| 2,894,206 | Montgomery | July 7, 1959 |